United States Patent [19]
Peterson

[11] 3,822,718
[45] July 9, 1974

[54] APPARATUS FOR MOVING A PLUG FITTING
[76] Inventor: Ralph L. Peterson, 27 Woodward Dr., West Seneca, N.Y. 14224
[22] Filed: Oct. 2, 1972
[21] Appl. No.: 293,763

[52] U.S. Cl. ............................................. 137/317
[51] Int. Cl. ....................... B23b 41/08, F16e 41/04
[58] Field of Search ...... 137/315, 317, 318; 138/89, 138/90, 92, 94, 97; 285/197; 29/157.1, 213

[56] References Cited
UNITED STATES PATENTS
153,606    7/1874   Plimley .......................... 137/318 X
1,590,186  6/1926   Fanselow .......................... 137/318

Primary Examiner—Alan Cohan
Assistant Examiner—David R. Matthews
Attorney, Agent, or Firm—Sommer & Sommer

[57] ABSTRACT

Apparatus is provided for moving a plug fitting relative to a hole in a conduit. A housing is mounted on a conduit over a fitting to be removed. An aligned drawbar mounted on the housing, is descended and interlocked with the fitting. The fitting is withdrawn from the hole and moved to an out-of-the-way position. A rod holding a second fitting is slidably mounted within the drawbar to descend, insert and release the second fitting when properly inserted in the hole.

13 Claims, 8 Drawing Figures

PATENTED JUL 9 1974 3,822,718

APPARATUS FOR MOVING A PLUG FITTING

BACKGROUND OF THE INVENTION

Utility service lines for individual dwellings have historically been connected to a water main by a plug stop fitting which was frictionally held in position in a hole in the main. Many municipalities have passed regulations requiring such plug fittings to be replaced with another threaded connection at a different point on the main.

Accordingly, utility companies have been faced with the problem of removing an existing plug fitting and filling the hole in the conduit. Desirably, this exchange should occur with no interruption of service to any consumer.

The problem of replacing fittings is further complicated by pressure of the fluid such as water in the main during the exchange.

Apparatus has been developed to perform other types of operations (i.e., drilling, tapping, etc.) on pressurized mains or lines, such as that disclosed by Gajdos U.S. Pat. No. 3,669,139, Mueller U.S. Pat. No. 2,966,814 and Smith U.S. Pat. No. 2,899,983. These early attempts to solve their diverse problems have generally contemplated an intermediate disassembly of the apparatus before completion of their individual tasks. Accordingly, applicant has devised novel apparatus for replacing plug fittings in a fluid-carrying conduit without interruption of service and without the need for intermediate disassembly of this apparatus.

SUMMARY OF THE INVENTION

The present invention relates to apparatus for moving a plug fitting relative to a hole in a conduit.

One object of the present invention is to provide apparatus for withdrawing a plug fitting from a hole in a conduit.

Another object is to provide apparatus for inserting a plug fitting into a hole in a conduit.

Another object is to provide apparatus for exchanging plug fittings in a conduit without requiring intermediate disassembly of the apparatus.

Another object is to provide apparatus for moving a withdrawn fitting to an out-of-the-way position.

Another object is to provide apparatus which may be aligned so that a plug fitting may be axially withdrawn from a hole.

In accordance with the present invention, apparatus is provided for moving a plug fitting relative to a hole, comprising a housing mountable on a conduit over a first fitting arranged in and to be removed from the hole, support mean movably mounted on the housing and including an inner portion arranged within the housing for movement toward and away from the fitting, interlock means carried by the inner portion and arranged for selective interlocking engagement with the fitting, and force means operatively interposed between the housing Still another object is to provide apparatus for aligning a plug fitting with a hole before insertion of the fitting into the hole. and support means for withdrawing the fitting from the hole. The apparatus may also be provided with insertion means movably mounted on the housing and including an inner portion disposed within the housing for movement toward and away from the hole, and holding means mounted on the inner portion of the insertion means for holding a second plug fitting to be inserted in the hole and for selectively releasing the second plug fitting when inserted in the hole. The apparatus may be additionally provided with alignment means mounted on the housing and utilizable for aligning the support means or the insertion means with the hole. Moreover, the apparatus may have resilient means connecting the first fitting to the housing for moving the first fitting after it is withdrawn from the hole.

These and other objects and advantages will become apparent from the foregoing and ongoing specification, the drawings and the appended claims.

BRIEF DESCRIPTION OF THE DRAWINGS

FIG. 3 is a sectional view similar to FIG. 2, but showing the fully assembled apparatus mounted on the conduit and illustrating the condition of the apparatus preliminary to the exchange of plug fittings.

FIG. 4 is a sectional view similar to FIG. 3, showing the interlock means still engaging an immediately withdrawn fitting.

FIG. 5 is a sectional view similar to FIG. 4, showing the withdrawn fitting moved to a side of the housing and further showing an inserted second fitting.

DETAILED DESCRIPTION OF THE DRAWINGS

Figure 1:
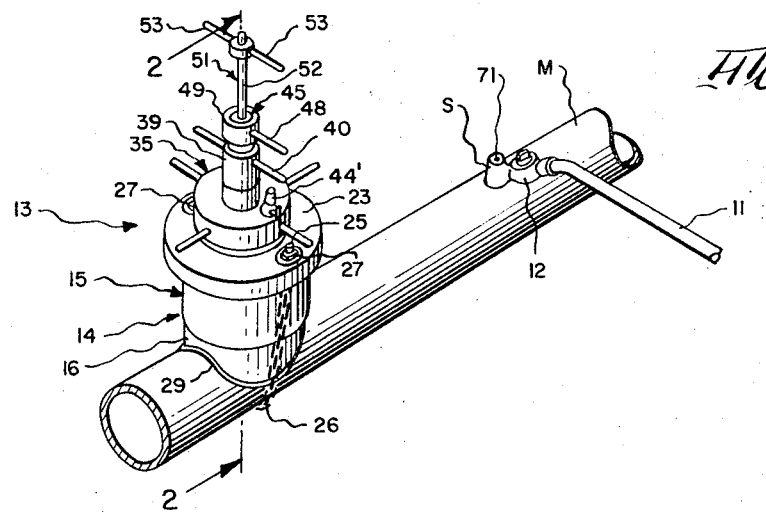
FIG. 1 is a perspective view of a water main showing the apparatus of the present invention mounted thereon and further showing another fitting to be removed at a distant location.

Referring to FIG. 1, a conduit such as a water main M is shown as having a radially extending, tapered hole 10 in the wall thereof, receiving a plug fitting, such as stop S. Service line 11 is threadedly connected to stop S. Thus, water in the main is supplied to an individual dwelling or consumer through stop S and service line 11. Stop S includes valve 12 to provide the capability of shutting off the supply of water to the service line at the main. Normally, water in the main is pressurized.

Figures 2, 8:
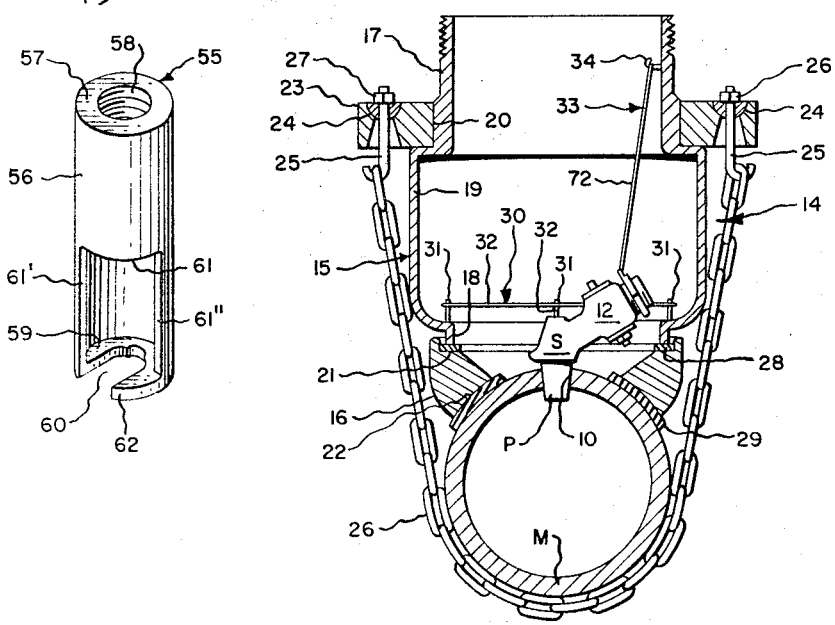
FIG. 2 is a partial vertical sectional view, taken on line 2—2 of FIG. 1, showing the lower portion of the apparatus mounted on the conduit.
FIG. 8 is a perspective view of the interlocking means.

The preferred embodiment of the present invention, generally indicated at 13, is shown mounted on the main over a stop to be removed, as best depicted in FIG. 2.

In FIG. 2, the manner in which a lower portion of the apparatus may be mounted on the main is depicted. The lower portion includes a housing, generally indicated at 14, having an upper section 15 and a lower section or saddle 16.

Upper housing section 15 has an exteriorly threaded upper neck 17, a lower neck 18, and an enlarged intermediate portion 19 therebetween. The outside upwardly facing horizontal surface of the offset between housing sections 17 and 19 forms an annular shoulder 20.

Lower housing section or saddle 16 has an upwardly facing horizontal annular shoulder 21 and has its lower surface 22 complementarily configured with the surface of the main.

A hold-down ring 23 surrounds upper neck 17 of upper housing section 15 and rests on shoulder 21. Ring 23 has diametrically opposed vertical holes 24 through which hook fasteners 25 pass. A length of chain 26 has an intermediate bight portion passed around the main M and has its distal ends severally connected to hook fasteners 25. Nuts 27 are screwed on the externally threaded upper end portions of the shanks of these hook fasteners above ring 23 and bear against this ring for tightening the chain.

Gaskets 28 and 29 are interposed between upper and lower housing sections 15 and 16, and between lower housing section 16 and the main, respectively. Thus, by adjusting nuts 27, chain 26 may be tightened around the main to compress gaskets 28 and 29 and thereby sealingly secure housing 14 to the main.

Alignment means, generally indicated at 30, are also illustrated in FIG. 2 as comprising a plurality of orientation devices 31 mounted on housing 14 in predetermined positions. Four such devices as upstanding pins are shown arranged in diametrically opposed pairs. Cross-hairs 32 extend between the pairs of these orientation devices. These cross-hairs are preferably rubber bands stretched tautly between opposing pairs.

Resilient means, generally indicated at 33, are shown as comprising an elastic element 72 suitably secured at one end to a hook 34 mounted on the interior surface of upper neck 17 of the upper housing section, and at its other end to stop S. Elastic element 72 is tensioned between hook 34 and stop S.

Stop S is shown as having a downwardly and inwardly tapered plug portion P which is frictionally held in hole 10 in the main.

A cap 35 is shown as including an internally threaded lower vertical cylindrical portion 36, and integral intermediate horizontal flange portion 37, and an integral vertical upper cylindrical neck portion 37' having a central vertical through bore 38. Cap 35 is shown threaded on to upper neck 17 of the upper housing section to define a sealed chamber 44 between the cap, the housing, and the main. A nut 39 having handles 40 radiating horizontally outward therefrom is restrained on the cylindrical neck by arms 41. An annular thrust bearing 42 is interposed between nut 39 and neck portion 37'. Nut 39 also has a threaded internal bore 43. A stopcock 44' is threaded through flange portion 37 of the cap for selectively releasing pressure in chamber 44.

Support means, generally indicated at 45, are shown as comprising a vertical cylindrical drawbar 46 provided with an internal concentric cylindrical bore 47. Drawbar 46 is exteriorly threaded at its lower end indicated at 46' and at an intermediate portion near its upper end indicated at 46''. A handle 48 is mounted on the drawbar at its uppermost end, via block 49 and setscrew 50, and extends radially outwardly therefrom. Threaded portion 46'' is received in nut 39. Rotation of drawbar 46 while holding nut 39 stationary causes axial movement of this drawbar relative to this nut. Rotation of nut 39 while holding drawbar 49 stationary also causes relative axial movement between these elements. Rotation of handle 40 also rotates nut 39 causing drawbar 46 to move relative to cap 35, and hence relative the main. Specifically, handle 40 may be suitably rotated to make drawbar 46 have a line of movement toward or away from stop S. O-ring 54 provides a seal between the drawbar and the cap.

Insertion means, generally indicated at 51, includes a vertically elongated rod-like member 52 moveably and slidably mounted in concentric bore 47 of the drawbar. Handles 53 are horizontally mounted on the rod-like member at its upper end. The lower end of member 52 extends beyond drawbar 46 into chamber 44. The insertion means thus has a line of movement toward and away from stop S.

Interlock means, generally indicated at 55, are mounted on the lower end of the drawbar 46 and include a hook member such as tubular sleeve 56. As best shown in FIG. 8, the sleeve is generally cylindrical in shape having a horizontal top wall 57 through which a central hole 58 is drilled and tapped for suitable attachment to the threaded lower portion 46' of drawbar 46. This threaded connection is suitably made fast as by pinning (not shown) so that the drawbar and hook member always rotate together. Sleeve 56 also has a horizontal bottom wall 59 provided with a recess 60 which extends almost diametrically across it and opening to the periphery thereof. Sleeve 56 also has an opening 61 extending upwardly from bottom wall 59 and in line with one edge 61' of recess 60. The other edge 61'' of opening 61 extends beyond the other side of recess 60 so as to expose a portion of bottom wall 59 to provide a lip 62.

Figure 6:
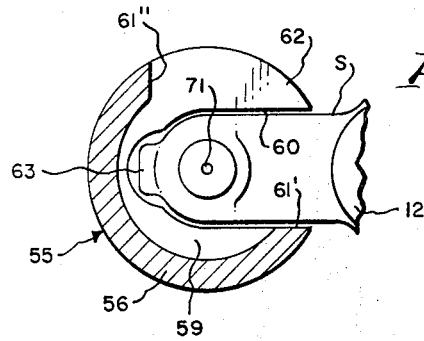
FIG. 6 is a horizontal sectional view of the interlock means, taken along line 6—6 of FIG. 3, showing the interlock means passed over and enveloping the fitting to be removed.

As most clearly illustrated in FIG 6, recess 60 is cooperatively configured to pass over the stop to be removed. When aligned as shown in FIG. 6, sleeve 56 may be moved toward the main to envelop the stop.

Figure 7:
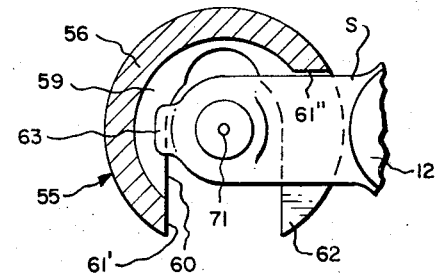
FIG. 7 is another horizontal sectional view of the interlock means, taken along line 7—7 of FIG. 4, showing the interlock means rotated 90° clockwise to engage with and interlock the fitting.

When the support means have been lowered to a suitable position (FIG. 3), handle 48 may be rotated 90 degrees clockwise as viewed from above, producing a corresponding movement of the drawbar and the sleeve from the position shown in FIG. 6 to that shown in FIG. 7. Rotation of the sleeve causes lip 62 to pass under a portion of the stop. Similarly, recess 60 is moved to a non-aligned position such that another portion of the sleeve bottom 59 marginal to one side of this recess passes under nose 63 of the stop. By so rotating the drawbar, sleeve 56 is selectively moved into interlocking engagement with the stop. In this interlocked position, drawbar 46 may be moved vertically upward to withdraw the stop from the hole, as depicted in FIG. 4.

Neck 37' of cap 35, thrust bearing 42, nut 39 and its threaded engagement at 43 and 46'' with drawbar 46, constitute force means operatively interposed between the housing 14 and support means 45. By holding handle 48, sleeve 56 is restrained in the operative or engaging interlock position shown in FIG. 7. Handles 40 may then be suitably rotated to move the drawbar and sleeve away from the hole. In this fashion, the stop S may be withdrawn from hole 10.

Holding means 64 are mounted on a lower portion of rod-like member 52 and include body 65 suitably secured to member 52, as by setscrew 66. The bottom of body 65 has a recess 67 for receiving an upper stem portion 68 of replacement plug 69 to be inserted in hole 10. The lower portion of this plug is tapered. Stem portion 68 is held in body 65 by spring-biased ball detent 70 acting thereon. As before discussed, rod-like member 52 is movably and slidably mounted in drawbar 46.

Figures 3, 4, 5:
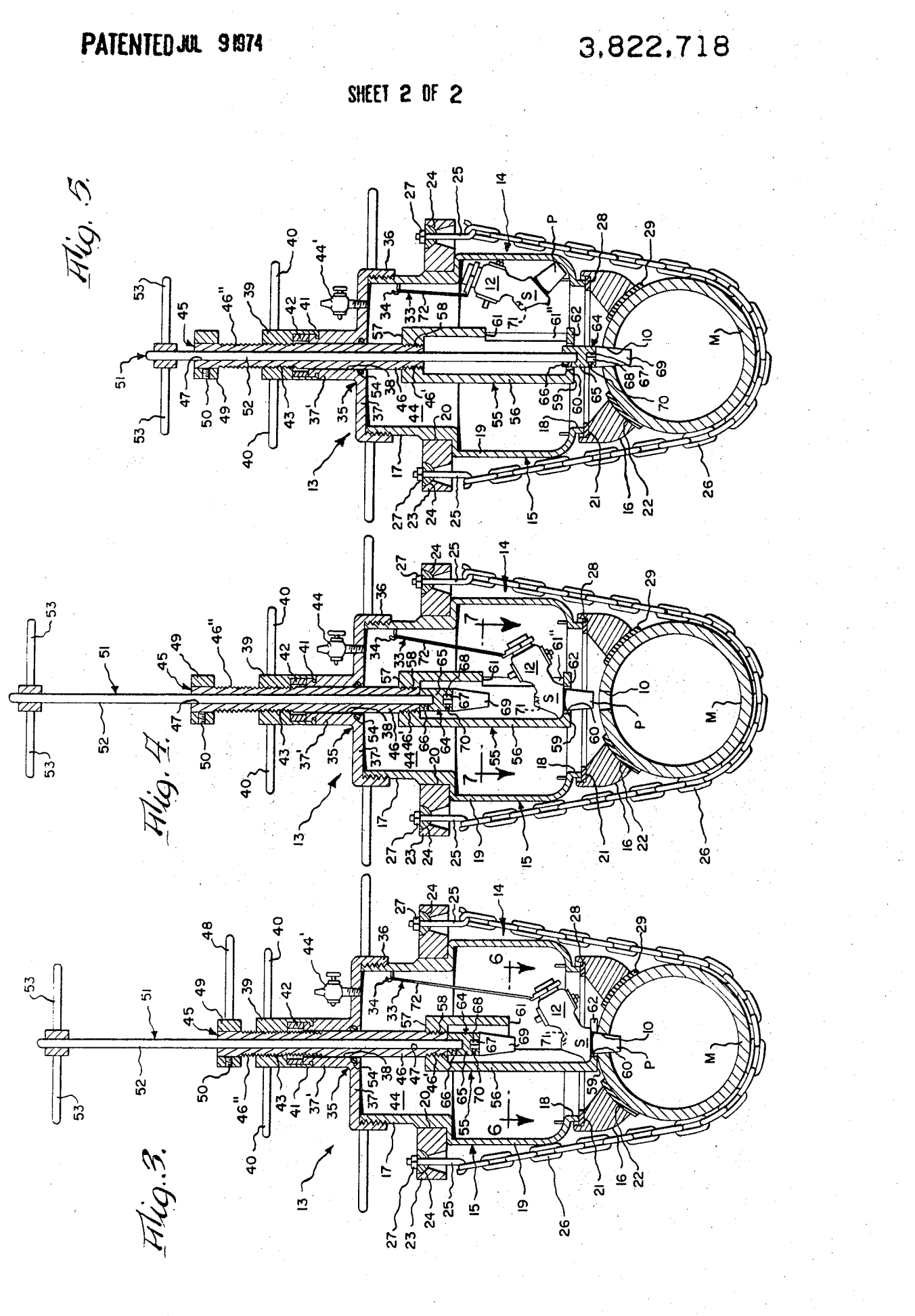

When the stop S has been immediately withdrawn from hole 10, as shown in FIG. 4, tensioned elastic element 72 pulls the withdrawn stop toward the housing and laterally away from the line of movement of the insertion means, as depicted in FIG. 5.

Once the withdrawn stop has been moved to an out-of-the-way position, the insertion means may be moved towards the hole by pushing down on handles 53. Plug 69 is thus inserted in hole 10 and may be further hammered into place by striking the top of member 52.

When the plug 69 has been sufficiently driven into the hole, handles 53 may be lifted. The frictional forces between plug 69 and hole 10 will be greater than the force exerted by detent 70 on the plug. In this fashion, the holding means selectively release the plug when properly inserted in the hole.

OPERATION

To remove a stop, housing 14 is loosely mounted on the conduit over the stop to be removed, as depicted in FIG. 2. Cross-hairs 32 are positioned between opposing pairs of orientation devices 31, thereby defining a center at their intersection. The operator may then adjust the housing to align the center with a notch or punch mark 71 on the top of stop S, which is on the axis of the tapered plug portion P of this stop. When properly positioned, nuts 27 may be tightened to sealingly secure the aligned housing to the main.

cross-hairs 32 may then be removed and elastic element 72 may be tensioned between hook 34 and the stop.

Plug 69 may be inserted into the holding means and handles 40 may be rotated to move the drawbar to its uppermost position. Similarly, handles 53 may be raised to move the insertion means to their uppermost position.

With stopcock 44' closed, cap 35 may then be threaded on to the housing and handle 48 may be moved to the position of FIG. 3 to align the interlocking means to the arrangement shown in FIG. 6. By holding handle 48, and by suitably rotating handles 40, the support means may be lowered to pass over and envelop the stop. When suitably descended, as in FIG. 3, handle 48 may be rotated 90° clockwise to move the interlock means into interlocking engagement with the stop (FIG. 7).

Handles 40 may then be oppositely rotated to cause the force means to move the support means, and hence the engaged interlock means, to withdraw the stop (FIG. 4). Tensioned elastic 72 moves the withdrawn stop laterally away from the line of movement of the support means (FIG. 5).

Handles 53 are then moved vertically downward to inser plug 69 into the hole. The top of the insertion means is hammered to drive plug 69 further into the hole. Handles 53 are moved upward and the holding means release plug 69.

Stopcock 45 may then be opened to release pressure in housing chamber 44. The apparatus may then be disassembled in reverse order and plug 69 may be additionally hammered to securely seat the plug in the hole.

In this manner, a stop may be removed from a hole in a conduit and a replacement plug inserted without partially disassembling the apparatus.

It should be clearly understood that the apparatus of the present invention may be similarly employed on any fluid-carrying conduit or container. By way of information and without limitation, such conduits may convey fluids in a liquid or gaseous state commonly associated with utilities, such as water, gas, oil or wastes. Furthermore, such conduits or containers may be pressurized or unpressurized.

As used herein, the term "plug fitting" broadly encompasses any type of fitting or connection which may be frictionally held in a hole. A common type of such plug fitting has a tapered plug for increasing the frictional forces between the plug and the perimetral surfaces and edges of a hole as the fitting is driven further therein.

The interlocking means contemplate any type of device or apparatus, such as a hook member, operative to abut and move into selective interlocking engagement with a fitting to be removed. Such devices may grasp or grip the fitting in any operative manner.

What is claimed is:

1. Apparatus for moving a plug fitting relative to a hole in a conduit, comprising:
   a housing mountable on said conduit over a first plug fitting arranged in and to be removed from said hole;
   support means movably mounted on said housing and including an inner portion arranged within said housing for movement toward and away from said first fitting;
   interlock means carried by said inner portion and arranged for selective interlocking engagement with said first fitting;
   force means operatively interposed between said housing and support means for withdrawing said first fitting from said hole;
   resilient means connecting said first fitting to said housing for moving said first fitting after being withdrawn from said hole;
   insertion means movably mounted on said housing and including an inner portion disposed within said housing for movement toward and away from said hole; and
   holding means mounted on said inner portion of said insertion means for holding a second plug fitting to be inserted in said hole and for selectively releasing said second fitting when inserted in said hole.

2. The apparatus of claim 1 wherein said resilient means moves such withdrawn first fitting toward said housing.

3. Apparatus of claim 2 wherein said insertion means has a line of movement and said resilient means moves said withdrawn first fitting laterally away from said line of movement of said insertion means.

4. The apparatus of claim 3 wherein said resilient means includes an elastic element in tension when said first fitting is arranged in said hole.

5. The apparatus of claim 1 further comprising alignment means mounted on said housing utilizable for aligning said insertion means with said hole.

6. The apparatus of claim 5 wherein said insertion means has a line of movement of said alignment means includes a plurality of orientation devices mounted on said housing and arranged in predetermined positions relative to said line of movement.

7. The apparatus of claim 6 wherein said alignment means further includes a plurality of cross-hairs extending between pairs of said orientation devices.

8. The apparatus of claim 1 wherein said insertion means is movably mounted within said support means.

9. The apparatus of claim 8 wherein said insertion means includes a rod-like member having one portion within said housing and another portion outside said housing.

10. The apparatus of claim 9 wherein said rod-like member is slidably mounted within said support means.

11. The apparatus of claim 1 wherein said interlock means includes a hook member for abutting a portion of said first fitting.

12. The apparatus of claim 11 wherein said hook member may be selectively moved into interlocking engagement with said first fitting.

13. The apparatus of claim 12 wherein said hook member is a tubular sleeve having lateral and end openings.

* * * * *

PO-1050
(5/69)

UNITED STATES PATENT OFFICE
CERTIFICATE OF CORRECTION

Patent No. 3,822,718　　　　　Dated July 9, 1974

Inventor(s) Ralph L. Peterson

It is certified that error appears in the above-identified patent and that said Letters Patent are hereby corrected as shown below:

Column 1, between lines 47 and 48, the following paragraph should be inserted:
--Still another object is to provide apparatus for aligning a plug fitting with a hole before insertion of the fitting into the hole.--;

Column 1, lines 59-61: "Still another object is to provide apparatus for aligning a plug fitting with a hole before insertion of the fitting into the hole." should be deleted;

Column 3, line 64: "49" should be --46--;

Column 5, line 31: "cross-hairs" should be --Cross hairs--;

Claim 6, line 2: "of", second occurrence, should be --and--.

Signed and sealed this 11th day of March 1975.

(SEAL)
Attest:

RUTH C. MASON
Attesting Officer

C. MARSHALL DANN
Commissioner of Patents
and Trademarks